United States Patent
Wolowski (10) Patent No.: US 9,573,507 B2
(45) Date of Patent: Feb. 21, 2017

(54) LATCH MECHANISM FOR AN AGRICULTURAL CONVEYOR SYSTEM

(71) Applicant: CNH Industrial Canada, Ltd., Saskatoon (CA)

(72) Inventor: Evan John Bruce Wolowski, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 5 days.

(21) Appl. No.: 14/694,944

(22) Filed: Apr. 23, 2015

(65) Prior Publication Data

US 2015/0307286 A1 Oct. 29, 2015

Related U.S. Application Data (60) Provisional application No. 61/984,497, filed on Apr. 25, 2014.

(51) Int. Cl.
*B60P 1/00* (2006.01)
*B60P 1/42* (2006.01)
*A01B 59/00* (2006.01)

(52) U.S. Cl.
CPC .. *B60P 1/00* (2013.01); *B60P 1/42* (2013.01); *A01B 59/006* (2013.01)

(58) Field of Classification Search
CPC ....... A01B 73/067; A01B 49/06; A01B 49/04; A01B 59/006; A01B 59/042; A01B 73/044; A01B 73/042; B65G 65/32; B65G 41/002; B65D 88/54; A01M 7/0075; A01M 7/0078; B60P 1/00; B60P 1/42

See application file for complete search history.

(56) References Cited

U.S. PATENT DOCUMENTS

| | | |
|---|---|---|
| 3,814,191 A | 6/1974 | Tilbury |
| 4,136,743 A | 1/1979 | van der Lely |

(Continued)

FOREIGN PATENT DOCUMENTS

CA 2703459 A1 11/2011

OTHER PUBLICATIONS

Positioning Auger; Manual; Jul. 2000; http://manuals.deere.com/omview/OMA72117_19/AG_OUO6023_1178_19_21JUL00_1.htm; accessed Apr. 23, 2015.

(Continued)

*Primary Examiner* — Glenn Myers
(74) *Attorney, Agent, or Firm* — Rebecca L. Henkel; Rickard K. DeMille (57) ABSTRACT

A system includes an agricultural conveyor system including an inner arm having a first end. The first end is configured to rotatably couple to an agricultural storage system. The agricultural conveyor system also includes an outer arm having a first end, a second end, and a pivot positioned between the first end and the second end. In certain embodiments, the first end of the outer arm is coupled to a mounting element, a second end of the inner arm is rotatably coupled to the outer arm at the pivot, and an agricultural conveyor is configured to rotatably couple to the second end of the outer arm. The agricultural conveyor system includes a rotation control assembly. The rotation control assembly is configured to couple to the agricultural storage system. The agricultural conveyor system also includes an intermediate link having a first end engaged with the rotation control assembly and a second end. In some embodiments, the agricultural conveyor system includes a latching mechanism coupled to the second end of the intermediate link. A latch of the latching mechanism is configured to transition between a latched position and an unlatched position. In (Continued)

some embodiments, the latch captures the mounting element in the latched position and the latch releases the mounting element in the unlatched position.

15 Claims, 8 Drawing Sheets

(56) References Cited

U.S. PATENT DOCUMENTS

| | | | |
|---|---|---|---|
| 4,316,511 A | 2/1982 | Andersen | |
| 4,660,654 A | 4/1987 | Wiebe et al. | |
| 4,747,612 A * | 5/1988 | Kuhn | A01B 59/042 |
| | | | 172/275 |
| 5,251,704 A | 10/1993 | Bourgault et al. | |
| 5,913,369 A | 6/1999 | Bodie et al. | |
| 6,186,244 B1 | 2/2001 | Friggstad | |
| 7,438,137 B2 * | 10/2008 | Pederson | A01B 73/044 |
| | | | 172/311 |
| 7,500,814 B2 * | 3/2009 | Meyer | A01C 15/003 |
| | | | 198/311 |
| 7,849,933 B2 | 12/2010 | Marggi | |
| 7,862,068 B2 * | 1/2011 | Schlesser | A01B 59/042 |
| | | | 180/53.3 |
| 8,221,047 B2 | 7/2012 | Petersen et al. | |
| 8,549,689 B2 | 10/2013 | Johnson et al. | |
| 8,714,344 B2 | 5/2014 | Kowalchuk et al. | |
| 8,746,434 B2 | 6/2014 | Neufeld et al. | |
| 8,974,170 B2 | 3/2015 | Ryder et al. | |
| 9,333,892 B2 * | 5/2016 | Johnson | B60P 1/36 |
| 2005/0238469 A1 * | 10/2005 | Cresswell | A01C 15/006 |
| | | | 414/523 |
| 2013/0134012 A1 * | 5/2013 | Borkgren | A01D 90/10 |
| | | | 198/315 |
| 2014/0034341 A1 * | 2/2014 | Fast | A01B 73/044 |
| | | | 172/311 |
| 2014/0034342 A1 | 2/2014 | Friggstad | |
| 2014/0090958 A1 * | 4/2014 | Mulder | B65G 33/32 |
| | | | 198/586 |

OTHER PUBLICATIONS

2014 AirCart Manual; Seed Hawk; http://www.seedhawk.com/Documents/2014%20Aircart%20Operator%20Manual.pdf; accessed Apr. 23, 2015.

Amity Technology, LLC; Owners Operating & Parts Manual; 2800 & 3350 2012 Air System; amitytech.s3.amazonaws.com/air-carts/manuals/english/2012/Air%20System%202012%20ENG.pdf; accessed Apr. 23, 2015.

8XL VRT AirCart; http://www.morris-industries.com/media/application/media/8XL-VRT_Operators-V3_N44297-03A.pdf; Nov./Dec. 2011; accessed Apr. 23, 2015.

* cited by examiner

LATCH MECHANISM FOR AN AGRICULTURAL CONVEYOR SYSTEM

CROSS REFERENCE TO RELATED APPLICATIONS

This application claims priority from and the benefit of U.S. Provisional Patent Application No. 61/984,497, entitled "LATCH MECHANISM FOR AN AGRICULTURAL CONVEYOR SYSTEM," filed Apr. 25, 2014, which is hereby incorporated by reference in its entirety.

BACKGROUND

The invention relates generally to agricultural systems and, more particularly, to a latch mechanism for an agricultural conveyor system.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver agricultural product (e.g., seeds, fertilizer, etc.) to ground engaging tools within the seeding implement. Certain air carts include a metering system and an air conveyance system configured to deliver metered quantities of product into an airflow that transfers the product to the openers. Air carts may also include a product conveying system for moving product from an external source (e.g., a truck, a storage container, etc.) into the air cart. The product conveying system may include a hopper for receiving the product, and a conveyor for moving the product from the hopper to a storage tank in the air cart. Certain air carts include multiple storage compartments having independent openings for receiving product. In such configurations, a guide tube of the conveyor may be successively aligned with each opening to facilitate product flow into the respective storage compartment. In certain embodiments, the conveyor may be coupled to the air cart by an inner arm and an outer arm.

Each arm may include an independent actuating cylinder configured to adjust a position of the respective arm relative to the air cart. Unfortunately, coordinating movement of the inner and outer arms to align the guide tube with each storage compartment opening may be difficult and time-consuming, thereby increasing the duration associated with loading product into the air cart. Moreover, the arms may be coupled to associated equipment that restricts movement or rotation of the arms. For example, the associated equipment may limit the rotation of the arms relative to the air cart. As a result, alignment of the hopper may be difficult and time-consuming.

BRIEF DESCRIPTION

In one embodiment, an agricultural conveyor system includes an inner arm having a first end. The first end is configured to rotatably couple to an agricultural storage system. The agricultural conveyor system also includes an outer arm having a first end, a second end, and a pivot positioned between the first end and the second end. In some embodiments, a second end of the inner arm is rotatably coupled to the outer arm at the pivot, and an agricultural conveyor. The agricultural conveyor is configured to rotatably couple to the second end of the outer arm. The agricultural system includes a rotation control assembly. In some embodiments, the rotation control assembly is configured to couple to the agricultural storage system. Additionally, in some embodiments, the agricultural conveyor system includes a latching mechanism. The latching mechanism includes a housing having a recess. The recess is configured to receive a mounting element coupled to the first end of the outer arm. The latching mechanism also includes a latch rotatably coupled to the housing. In certain embodiments, the latch is configured to rotate about a latch axis in a first direction to secure the mounting element to the latching mechanism, and to rotate about the latch axis in a second direction, opposite the first direction, to release the mounting element from the latching mechanism. The agricultural conveyor system also includes an intermediate link having a first end engaged with the rotation control assembly and a second end coupled to the latching mechanism. In some embodiments, the rotation control assembly is configured to adjust a lateral position of the first end of the intermediate link based on rotation of the inner arm relative to the agricultural storage system to control an angle of the outer arm relative to the inner arm.

In another embodiment, an agricultural conveyor system includes an inner arm having a first end. The first end is configured to rotatably couple to an agricultural storage system. The agricultural conveyor system also includes an outer arm having a first end, a second end, and a pivot positioned between the first end and the second end. In certain embodiments, the first end of the outer arm is coupled to a mounting element, a second end of the inner arm is rotatably coupled to the outer arm at the pivot, and an agricultural conveyor is configured to rotatably couple to the second end of the outer arm. The agricultural conveyor system includes a rotation control assembly. The rotation control assembly is configured to couple to the agricultural storage system. The agricultural conveyor system also includes an intermediate link having a first end engaged with the rotation control assembly and a second end. In some embodiments, the agricultural conveyor system includes a latching mechanism coupled to the second end of the intermediate link. A latch of the latching mechanism is configured to transition between a latched position and an unlatched position. In some embodiments, the latch captures the mounting element in the latched position and the latch releases the mounting element in the unlatched position.

In another embodiment, an agricultural conveyor system includes a latching mechanism. The latching mechanism includes a housing and a latch. In some embodiments, the latch is rotatably mounted to the housing. The agricultural conveyor system also includes an inner arm having a first end and a second end. The first end is configured to rotatably couple to an agricultural storage system. The agricultural conveyor system also includes an outer arm having a first end, a second end, and a pivot positioned between the first end and the second end. In some embodiments, the first end includes a mounting element. The mounting element is configured to be captured by the latching mechanism. Moreover, the second end of the inner arm is rotatably coupled to the outer arm at the pivot, and an agricultural conveyor is configured to rotatably couple to the second end of the outer arm. The agricultural conveyor system also includes a rotation control assembly. The rotation control assembly is configured to couple to the agricultural storage system. In some embodiments, the agricultural conveyor system includes an intermediate link having a first end and a second end. The first end is engaged with the rotational control assembly and the second end is coupled to the latching mechanism. In some embodiments, the latch of the latching mechanism is configured to rotate about a latch axis in a first direction to a latched position to capture the mounting element and to rotatably secure the first end of the outer arm to the second end of the intermediate link, and to rotate about the latch axis in a second direction, opposite the first direction, to an unlatched position to release the mounting element from the latching mechanism.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a latching system for an agricultural conveyor. In particular, the latching system enables components of a position adjustment assembly to selectively decouple from one another, thereby increasing the range of motion of the conveyor. For instance, the position adjustment assembly may include an inner arm rotatably coupled to an agricultural storage system and an outer arm rotatably coupled to the inner arm and the agricultural conveyor. In some embodiments, an intermediate link is coupled to the outer arm via a latching mechanism. For example, in certain embodiments, the latching mechanism may rotatably secure the outer arm to the intermediate link. The intermediate link may block rotation of the outer arm about an axis, thereby blocking the conveyor from reaching certain portions of an air cart. In certain embodiments, the latching mechanism is configured to transition between a latched position and an unlatched position, thereby uncoupling the outer arm from the intermediate link. As a result, the outer arm may rotate farther about the axis relative to the intermediate link. In certain embodiments, the latching mechanism includes a latch configured to move between latched and unlatched positions to selectively secure the outer arm to the latching mechanism.

Figure 1:
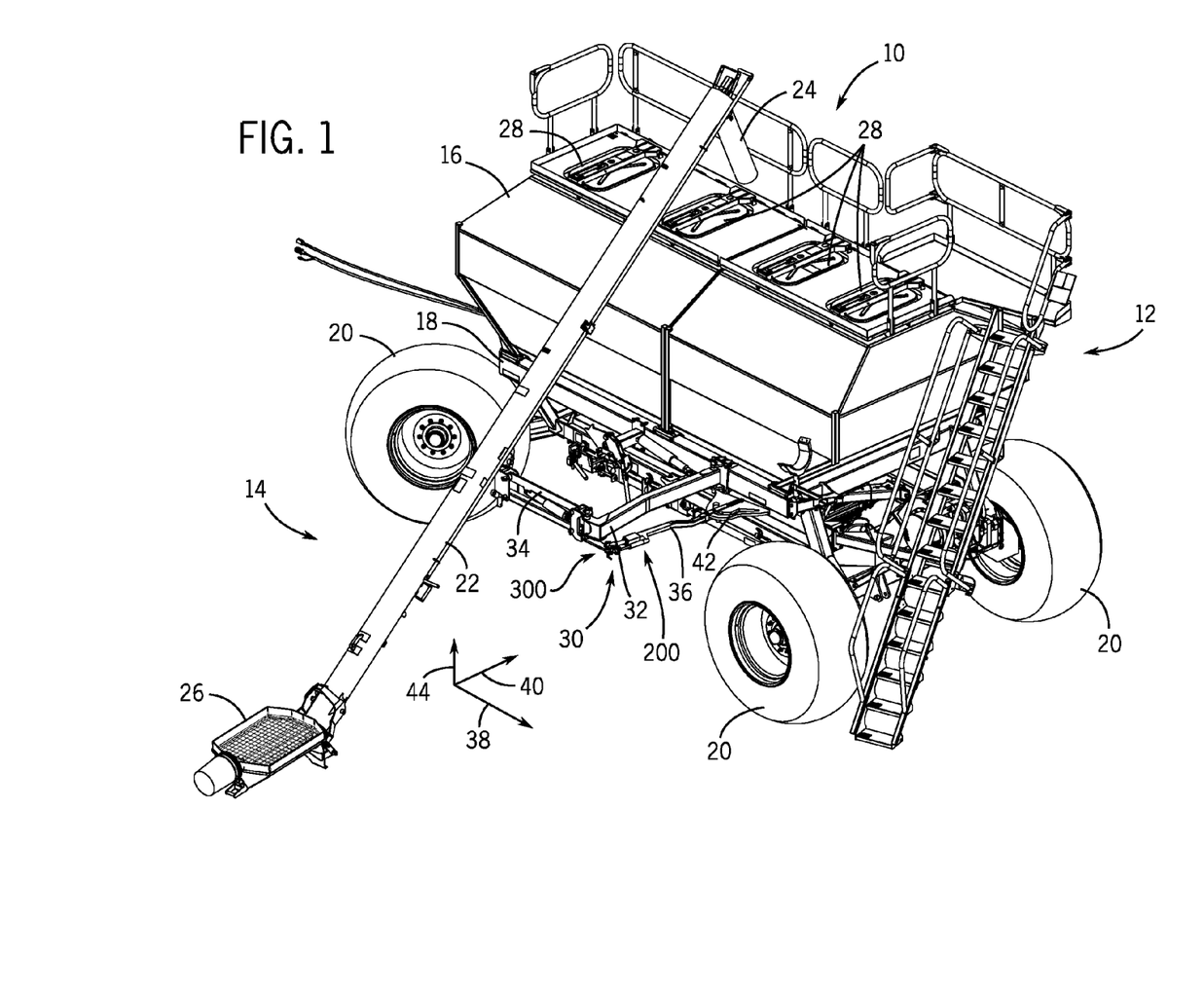
FIG. 1 is a perspective view of an embodiment of an agricultural system including an air cart having a conveyor for moving product.

FIG. 1 is a perspective view of an agricultural system 10 including an agricultural storage system, such as the illustrated air cart 12. In the illustrated embodiment, the agricultural system 10 includes a product conveyor 14 for moving product from an external source to the air cart 12. The air cart 12 includes one or more storage compartments 16 (e.g., holding containers), a frame 18, and wheels 20. The frame 18 includes a towing hitch configured to couple the air cart 12 to an implement or tow vehicle. In certain configurations, the storage compartments 16 may be used for storing various agricultural products. For example, one compartment may include seeds, and another compartment may include a dry fertilizer. In such configurations, the air cart 12 may be configured to deliver both the seeds and the fertilizer to an implement.

In certain embodiments, seeds and/or fertilizer within the storage compartments 16 are gravity fed into metering systems. The metering systems may include meter rollers to regulate the flow of product from the storage compartments 16 into an air flow provided by an air source. The air flow carries the product through one or more hoses or conduits to an implement, thereby supplying ground engaging tools of the implement with seeds and/or fertilizer for deposition into the soil.

In the illustrated embodiment, the product conveyor 14 includes a product transporting tube 22, a guide tube 24 coupled to one end of the product transporting tube 22, and a hopper 26 coupled to the other end of the product transporting tube 22. The conveyor 14 is configured to move agricultural product from the hopper 26, through the product transporting tube 22 and guide tube 24, and into the storage compartments 16. For example, the conveyor 14 may include screw type conveyors, such as augers, to move the agricultural product into the storage compartments 16. Additionally, other rigid tube and/or frame type conveyors may be used. For instance, belt type conveyors may move the agricultural product from the hopper 26 into the storage compartments 16. As will be appreciated, the product may be introduced into the hopper 26 from a product transporting vehicle, such as an end-dump truck or a belly-dump truck.

During loading operations, a product transporting vehicle delivers the agricultural product into the hopper 26 (e.g., via an outlet in a bottom portion of a trailer). The hopper 26 then transfers the product to the product transporting tube 22. For example, an auger in the hopper 26 may rotate to move the product to the product transporting tube 22. The product transporting tube 22 may also include an auger configured to receive product from the hopper 26, and to move the product to the guide tube 24, which directs the product into the storage compartments 16. In certain embodiments, the transporting tube auger is coupled to the hopper auger such that rotation of the transporting tube auger drives the hopper auger to rotate. In alternative embodiments, the hopper 26 may include a belt system configured to transfer product from the hopper 26 to the product transporting tube 22. Further, the product transporting tube 22 may include another belt system that interfaces with the belt system of the hopper 26. The transporting tube belt system is configured to move the product from the hopper 26 to the guide tube 24, which directs the product into the storage compartments 16.

In the illustrated embodiment, the air cart 12 includes four storage compartments 16, each having an independent opening 28 for receiving product. In this configuration, the guide tube 24 of the conveyor 14 may be successively aligned with each opening 28 to facilitate product flow into the respective storage compartment 16. To facilitate movement of the conveyor 14 relative to the air cart 12, the agricultural system 10 includes a position adjustment assembly 30. In the illustrated embodiment, the position adjustment assembly 30 includes an inner arm 32, an outer arm 34, and an intermediate link 36. As discussed in detail below, an actuator extending between the frame 18 of the air cart 12 and the inner arm 32 is configured to drive the inner arm 32 to rotate relative to the air cart 12. The intermediate link 36 is coupled to the outer arm 34 via a latching mechanism 300. The intermediate link 36 is configured to induce the outer arm 34 to rotate upon rotation of the inner arm 32 to automatically control a position of a distal end of the outer arm 34. For example, in certain embodiments, the position adjustment assembly 30 is configured to move the distal end of the outer arm 34 along a longitudinal axis 38, while maintaining the distal end at a substantially constant distance from the air cart 12 along a lateral axis 40. In this configuration, the position adjustment assembly 30 may align the guide tube 24 with each successive storage compartment opening 28 via adjustment of a single actuator. As a result, the duration associated with filling the air cart 12 with product may be substantially reduced, as compared to configurations that employ independently controllable inner and outer arms.

In the illustrated embodiment, the intermediate link 36 includes a lateral positioning assembly 200. The lateral positioning assembly 200 includes an actuator to adjust the length of the intermediate link 36. Extension and retraction of the actuator enables extension and retraction of the intermediate link 36, thereby inducing rotation of the outer arm 34. As discussed in detail below, extension and retraction of the actuator varies the lateral distance between the distal end of the outer arm 34 and the air cart 12. In some embodiments, the lateral positioning assembly 200 facilitates aligning the hopper 26 with the outlet of a belly-dump truck.

In certain embodiments, the position adjustment assembly 30 includes a rotation control assembly 42 configured to induce the intermediate link 36 to drive the outer arm 34 to rotate upon rotation of the inner arm 32. For example, the rotation control assembly 42 may include a cam, and the intermediate link 36 may include a follower configured to engage the cam. In such a configuration, contact between the cam and the follower drives the intermediate link 36 to move along the lateral axis 40 relative to the air cart 12 to facilitate rotation of the outer arm 34. For example, the cam may be shaped such that a lateral distance between the distal end of the outer arm 34 and the air cart 12 remains substantially constant as the distal end is driven to move along the longitudinal axis 38. In further embodiments, the outer arm 34 may include a height adjustment assembly configured to adjust a position of the conveyor 14 along a vertical axis 44 to facilitate alignment of the hopper 26 with the transporting vehicle, and/or to facilitate alignment of the guide tube 24 with the openings 28.

Figure 2:
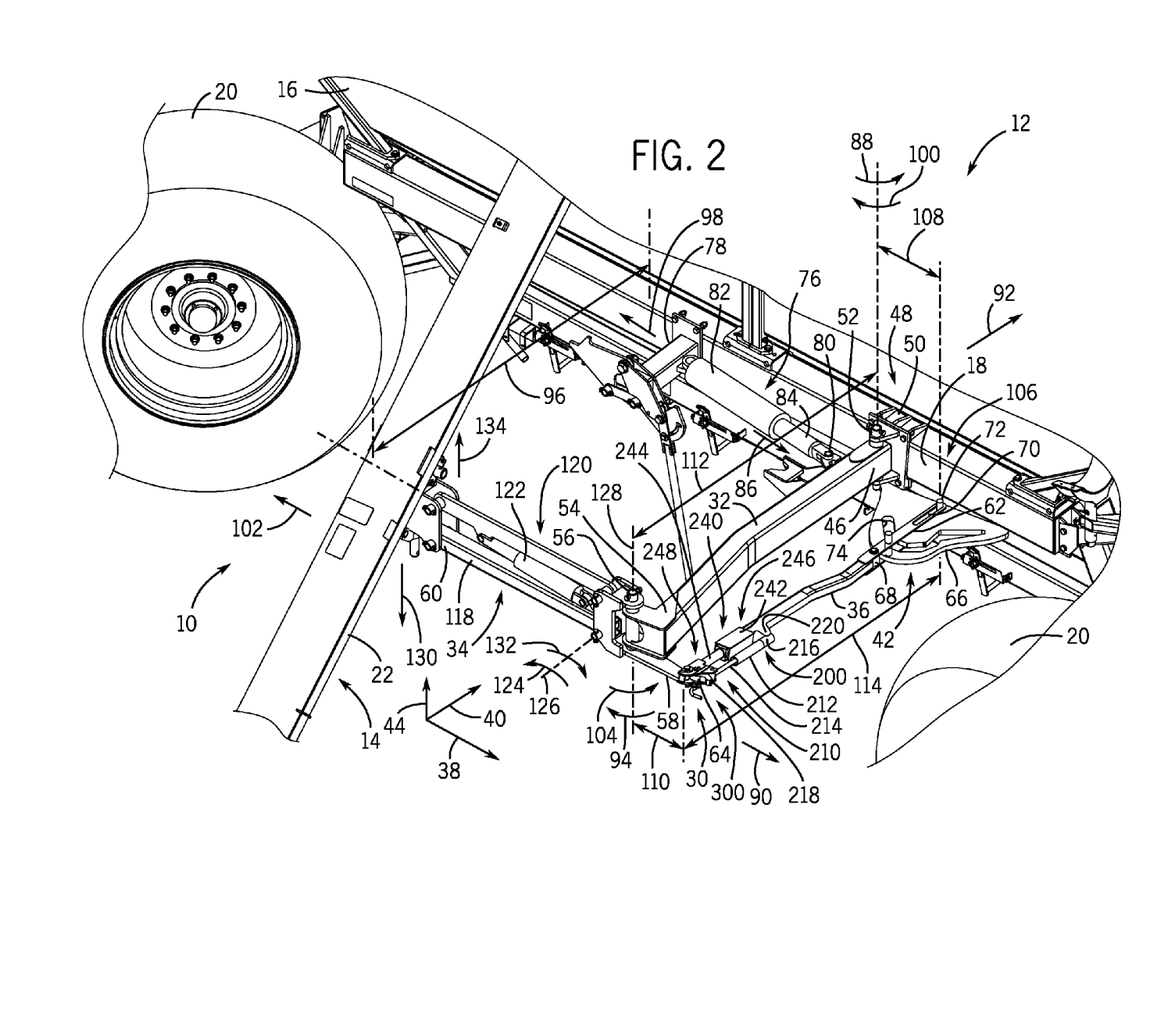
FIG. 2 is a perspective view of an embodiment of a position adjustment assembly that may be employed to adjust a position of a conveyor relative to the air cart of FIG. 1.

FIG. 2 is a perspective view of an embodiment of a position adjustment assembly 30 that may be employed to adjust a position of the conveyor 14 relative to the air cart 12. As previously discussed, the position adjustment assembly 30 is configured to move the conveyor 14 along the longitudinal axis 38 such that the guide tube 24 successively aligns with each storage compartment opening 28. As illustrated, a first end 46 of the inner arm 30 is rotatably coupled to the frame 18 of the air cart 12 at a first location 48. For example, in the illustrated embodiment, the position adjustment assembly 30 includes a mounting bracket 50 secured to the frame 18, and a pivot 52 configured to rotatably couple the first end 46 of the inner arm 32 to the mounting bracket 50. Furthermore, a second end 54 of the inner arm 32 is rotatably coupled to the outer arm 34 by a pivot 56. As illustrated, the pivot 56 is positioned between a first end 58 of the outer arm 34 and a second end 60 of the outer arm 34. The transporting tube 22 of the conveyor 14 is rotatably coupled to the second end 60 of the outer arm 34 to facilitate adjustment of an orientation of the conveyor 14 relative to the air cart 12. In the illustrated embodiment, the conveyor 14 is supported by the inner arm 32 and the outer arm 34, i.e., the arms 32 and 34 are configured to transfer the vertical load of the conveyor 14 to the frame 18 of the air cart 12. The arms 32 and 34 are also configured to facilitate position adjustment of the conveyor 14 relative to the air cart 12.

In the illustrated embodiment, the intermediate link 36 extends between the rotation control assembly 42 and the first end 58 of the outer arm 34. Specifically, a first end 62 of the intermediate link 36 is engaged with the rotation control assembly 42, and a second end 64 of the intermediate link 36 is rotatably coupled to the first end 58 of the outer arm 34 via the latching mechanism 300. As illustrated, the rotation control assembly 42 includes a cam 66, and the intermediate link 36 includes a follower 68. In this configuration, rotation of the inner arm 32 drives the follower 68 to move along the cam 66, thereby adjusting a lateral position of the first end 62 of the intermediate link 36. As a result, the intermediate link 36 drives the outer arm 34 to rotate about the pivot 56 upon rotation of the inner arm 32. For example, the cam 66 may be shaped such that a lateral distance between the second end 60 of the outer arm 34 and the air cart 12 remains substantially constant as the inner arm 32 rotates. In the illustrated embodiment, the intermediate link 36 includes a slot 70 configured to engage a pin 72 of the rotation control assembly 42, thereby securing the intermediate link 36 to the rotation control assembly 42. In addition, the illustrated rotation control assembly 42 includes a slot 74 configured to receive a pin of the intermediate link 36. In certain embodiments, contact between the pin and the slot 74 induces lateral movement of the intermediate link 36, either alone or in combination with the cam 66 and follower 68.

In the illustrated embodiment, the position adjustment assembly 30 includes a hydraulic cylinder 76 configured to rotate the inner arm 32 relative to the air cart 12. As illustrated, the hydraulic cylinder 76 includes a first end 78 rotatably coupled to the frame 18 of the air cart 12, and a second end 80 rotatably coupled to the inner arm 32. The hydraulic cylinder 76 includes a barrel 82, and a piston rod 84 configured to extend and retract relative to the barrel 82 to drive the inner arm 32 to rotate. While a hydraulic cylinder 76 is utilized in the illustrated embodiment, it should be appreciated that alternative linear actuators (e.g., screw drives, electromechanical actuators, etc.) may be employed in alternative embodiments. In further embodiments, a rotary actuator (e.g., hydraulic, electrical, etc.) may be directly coupled to the pivot 52 to drive the inner arm 32 to rotate.

In the illustrated embodiment, extension of the piston rod 84 in the direction 86 drives the inner arm 32 to rotate in the direction 88. As the inner arm 32 rotates, the second end 54 of the inner arm 32 moves in a direction 90, thereby translating the conveyor 14 along the longitudinal axis 38 in the direction 90. In addition, movement of the second end 54 of the inner arm 32 induces the intermediate link 36 to move in the direction 90, thereby driving the follower 68 along the cam 66. Due to the shape of the cam 66, the first end 62 of the intermediate link 36 is driven to move along the lateral axis 40. For example, movement of the follower 68 away from the apex of the cam 66 induces the first end 62 of the intermediate link 36 to move in a direction 92. As discussed in detail below, movement of the intermediate link 36 in the direction 92 and movement of the outer arm 34 in the direction 90 induces the outer arm 34 to rotate about the pivot 56 in a direction 94. In this configuration, the cam 66 may be shaped such that a lateral distance 96 between the second end 60 of the outer arm 34 and the air cart 12 is precisely controlled. For example, the distance 96 may remain substantially constant as the inner arm 32 rotates in the direction 88. As a result, the conveyor 14 may be positioned to facilitate alignment of the guide tube 24 with each successive storage compartment opening 28 via adjustment of the hydraulic cylinder 76.

Conversely, retraction of the piston rod 84 in the direction 98 drives the inner arm 32 to rotate in the direction 100. As the inner arm 32 rotates, the second end 54 of the inner arm 32 moves in the direction 102, thereby translating the conveyor 14 along the longitudinal axis 38 in the direction 102. In addition, movement of the second end 54 of the inner arm 32 induces the intermediate link 36 to move in the direction 102, thereby driving the follower 68 along the cam 66. Due to the shape of the cam 66, the first end 62 of the intermediate link 36 is driven to move along the lateral axis 40. For example, movement of the follower 68 away from the apex of the cam 66 induces the first end 62 of the intermediate link 36 to move in the direction 92. As discussed in detail below, movement of the intermediate link 36 in the direction 92 and movement of the outer arm 34 in the direction 102 induces the outer arm 34 to rotate about the pivot 56 in a direction 104. In this configuration, the cam 66 may be shaped such that the lateral distance 96 between the second end 60 of the outer arm 34 and the air cart 12 is precisely controlled. For example, the distance 96 may remain substantially constant as the inner arm 32 rotates in the direction 100. As a result, the conveyor 14 may be positioned to facilitate alignment of the guide tube 24 with each successive storage compartment opening 28 via adjustment of the hydraulic cylinder 76.

Because the illustrated position adjustment assembly 30 employs a single actuator to adjust the position of the conveyor 14, the process of moving the conveyor between successive storage compartments may be substantially simplified, as compared to configurations that employ independently controllable conveyor support arms. For example, certain position adjustment assemblies may include a first actuator to control a position of the inner arm, and a second actuator configured to control a position of the outer arm. In such configurations, coordinating movement of the inner and outer arms to align the guide tube with successive storage compartment openings may be difficult and time-consuming, thereby increasing the duration associated with loading product into the air cart. In contrast, the illustrated position adjustment assembly 30 is configured to move the conveyor 14 along the longitudinal axis 38, while maintaining a substantially constant distance 96 between the second end 60 of the outer arm 34 and the air cart 12, via adjustment of a single actuator. As a result, the duration associated with delivering product to the air cart 12 may be substantially reduced.

In alternative embodiments, the intermediate link 36 may be rotatably coupled directly to the frame 18 of the air cart 18, or to a support coupled to the mounting bracket 50. For example, in certain embodiments, the first end 62 of the intermediate link 36 is rotatably coupled to the air cart 12 at a second location 106, longitudinally offset from the first location 48. In this configuration, the intermediate link 36 drives the outer arm 34 to rotate about the pivot 56 in a first direction (e.g., the direction 94) upon rotation of the inner arm 32 in a second direction (e.g., the direction 88), opposite the first direction, such that the lateral distance 96 between the second end 60 of the outer arm 34 and the air cart 12 remains substantially constant. However, it should be appreciated that embodiments employing the rotation control assembly 42 may provide enhanced control of the conveyor 14 because the contour of the cam 66 may be particularly selected to achieve a desired relationship between rotation of the inner arm 32 and position of the second end 60 of the outer arm 34.

Furthermore, it should be appreciated that the geometry of the position adjustment assembly components may be particularly selected to establish a desired relationship between rotation of the inner arm 32 and position of the second end 60 of the outer arm 34. For example, in certain embodiments, a distance 108 between the first location 48 (i.e., the longitudinal position of the mounting bracket 50) and the second location 106 (e.g., the longitudinal position of the apex of the cam 66) may be substantially equal to a distance 110 between the first end 58 of the outer arm 34 and the pivot 56. In addition, a length 112 of the inner arm 32 may be substantially equal to a length 114 of the intermediate link 36. However, it should be appreciated that the lengths 112 and 114, and the distances 108 and 110 may be particularly adjusted to establish a desired relationship between rotation of the inner arm 32 and position of the second end 60 of the outer arm 34. For example, the geometry of the position adjustment assembly 30 may be configured to maintain the second end 60 of the outer arm 34 at a substantially constant lateral distance 96 from the air cart 12 upon rotation of the inner arm 32 relative to the air cart 12.

As previously discussed, the lateral positioning assembly 200 adjusts the position of the conveyor 14 relative to the air cart 12 along the lateral axis 40. In the illustrated embodiment, the lateral positioning assembly 200 is mounted along the intermediate link 36 and includes a hydraulic cylinder 210 and a telescoping member 240. While a hydraulic cylinder 210 is utilized as the actuator in the illustrated embodiment, it should be appreciated that alternative linear actuators (e.g., screw drives, electromechanical actuators, etc.) may be employed in alternative embodiments. The hydraulic cylinder 210 includes a barrel 212 and a piston rod 214. The piston rod 214 extends and retracts relative to the barrel 212 resulting in an increase and/or decrease to the length of the intermediate link 36. That is, the hydraulic cylinder 210 is configured to increase the distance of the second end 64 of the intermediate link 36 from the frame 18. Moreover, the hydraulic cylinder 210 includes a first end 216 coupled to a first mounting bracket 220 and a second end 218 coupled to the latching mechanism 300. Additionally, the telescoping member 240 includes a first end 246 coupled to the first mounting bracket 220 and a second end 248 coupled to the latching mechanism 300. The telescoping member 240 includes a sleeve 242 and a telescoping rod 244. In the illustrated embodiment, the telescoping rod 244 extends and retracts relative to the sleeve 242 as the hydraulic cylinder 210 extends and retracts. Furthermore, the telescoping member 240 provides rigidity with respect to the longitudinal axis 38. That is, the telescoping member 240 resists bending of the intermediate link 36 along the longitudinal axis 38 as a result of rotational forces. For example, rotational movement of the conveyor 14, the inner arm 32, or the outer arm 34 may apply a force to the intermediate link 36. In other embodiments, the hydraulic cylinder 210 is enclosed within the telescoping member 240, or the hydraulic cylinder 210 and the telescoping member 240 are integrally formed as a single device.

Extension of the hydraulic cylinder 210 causes the distance between the conveyor 14 and the air cart 12 to decrease. In other words, extension of the hydraulic cylinder 210 extends the intermediate link 36 and induces rotation of the outer arm 34 in the direction 94 about a rotational axis 128. As the piston rod 214 extends from the barrel 212 of the hydraulic cylinder 210, the second end 218 of the hydraulic cylinder 210 moves away from the air cart 12 along the lateral axis 40. Movement of the second end 218 of the hydraulic cylinder 210 drives the first end 58 of the outer arm 34 to move via coupling of the arms by the latching mechanism 300. As described in detail below, when the first end 58 of the outer arm 34 is coupled to the second end 64 of the intermediate link 36 by latching mechanism 300, movement of the intermediate link 36 drives the outer arm 34 to move. As a result, the first end 58 of the outer arm 34 moves away from the air cart 12 along the lateral axis 40 in response to extension of the hydraulic cylinder 210. As the first end 58 moves away from the air cart 12, the outer arm 34 rotates about the pivot 56 in the direction 94. Therefore, the second end 60 of the outer arm 34 moves toward the air cart 12. Because the conveyor 14 is coupled to the second end 60 of the outer arm 34, the conveyor 14 moves toward the air cart 12.

In contrast, retraction of the hydraulic cylinder 210 causes the distance between the conveyor 14 and the air cart 12 to increase. That is, retraction of the hydraulic cylinder 210 retracts of the intermediate link 36 and induces rotation of the outer arm 34 in the direction 104 about the rotational axis 128. As the piston rod 214 retracts into the barrel 212 of the hydraulic cylinder 210, the second end 218 of the hydraulic cylinder 210 moves toward the air cart 12 along the lateral axis 40. Movement of the second end 218 of the hydraulic cylinder 210 drives the first end 58 of the outer arm 34 to move via coupling of the arms by the latching mechanism 300. As a result, the first end 58 of the outer arm 34 moves toward the air cart 12 along the lateral axis 40. Movement of the first end 58 toward the air cart 12 drives the outer arm 34 to rotate about the pivot 56 in the direction 104. The rotation of the outer arm 34 about the pivot 56 moves to the conveyor 14, which is coupled to the second end 60 of the outer arm 34. As a result, the conveyor 14 moves away from the air cart 12. In this manner, the conveyor 14 may be moved closer to or farther away from the air cart 12 to facilitate alignment of the hopper 26, for example, with an outlet of a dump truck.

In the illustrated embodiment, the outer arm 34 is configured to adjust a height of the conveyor 14 relative to the air cart 12. As illustrated, the outer arm 34 includes a first member 116 extending between the first end 58 and the pivot 56. The outer arm 34 also includes a second member 118 rotatably coupled to the first member 116 adjacent to the pivot 56, and extending to the second end 60 of the outer arm 34. In the illustrated embodiment, the second member 118 is an element of a parallel linkage assembly 120 extending between the pivot 56 and the second end 60 of the outer arm 34. However, it should be appreciated that a single member may extend between the pivot 56 and the second end 60 in alternative embodiments. As illustrated, an actuator 122 is coupled to the parallel linkage assembly 120, and configured to adjust a height of the conveyor 14. For example, the actuator 122 may rotate the second member 118 in a downward direction 124 about an axis 126 substantially perpendicular to the rotational axis 128 of the pivot 56, thereby inducing the conveyor 14 to move in a downward direction 130 along the vertical axis 44. Conversely, the actuator 122 may rotate the second member 118 in an upward direction 132, thereby driving the conveyor 14 to move in an upward direction 134 along the vertical axis 44. In this manner, the height of the conveyor 14 may be particularly adjusted to facilitate alignment between the guide tube 24 and the storage compartment openings 28.

Figure 3:
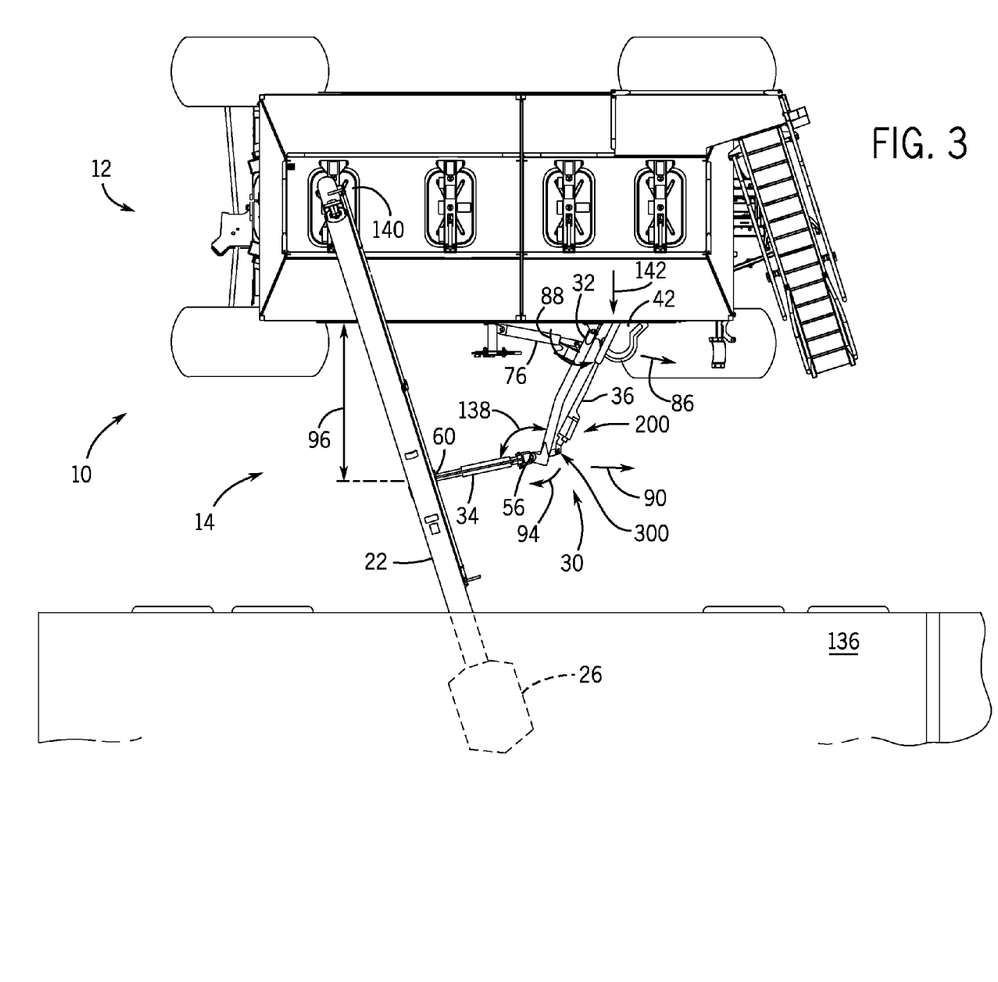
FIG. 3 is a top view of the position adjustment assembly of FIG. 2, in which the conveyor is aligned with a first storage compartment opening.

FIG. 3 is a top view of the position adjustment assembly 30, in which the conveyor 14 is aligned with a first storage compartment opening. In the illustrated embodiment, a belly-dump truck 136 is positioned adjacent to the air cart 12, thereby enabling the conveyor 14 to transfer product from the truck 136 to the air cart 12. As illustrated, the hydraulic cylinder 76 is in a substantially retracted position, thereby establishing an angle 138 between the inner arm 32 and the outer arm 34. Due to the geometry of the position adjustment assembly components, the second end 60 of the outer arm 34 is positioned to facilitate alignment of the conveyor 14 with a first storage compartment opening 140. In addition, the hopper 26 is aligned with an outlet of the truck 136. Consequently, product may flow from the truck outlet to the hopper 26, through the transporting tube 22, and into the first storage compartment opening 140.

Once a desired quantity of product has been delivered to the first storage compartment, the conveyor 14 may be aligned with a successive storage compartment opening. For example, extension of the hydraulic cylinder 76 in the direction 86 drives the inner arm 32 to rotate in the direction 88. As the inner arm 32 rotates, the outer arm 34, the conveyor 14 and the intermediate link 36 are driven in the direction 90. Due to the shape of the rotation control assembly 42, movement of the intermediate link 36 in the direction 90 induces lateral movement of the intermediate link 36 in the direction 142, thereby driving the outer arm 34 to rotate about the pivot 56 in the direction 94. As a result, a distance 96 between the second end 60 of the outer arm 34 and the air cart 12 remains substantially constant as the inner arm 32 rotates in the direction 88. Consequently, the conveyor 14 may be translated in the direction 90 while maintaining a desired distance from the air cart 12, thereby facilitating alignment of the conveyor 14 with a successive storage compartment opening. Because the conveyor 14 may be positioned to successively fill each storage compartment 16 via adjustment of a single actuator, the duration associated with filling the air cart 12 with product may be substantially reduced, as compared to configurations that employ independently controllable inner and outer arms.

Figure 4:
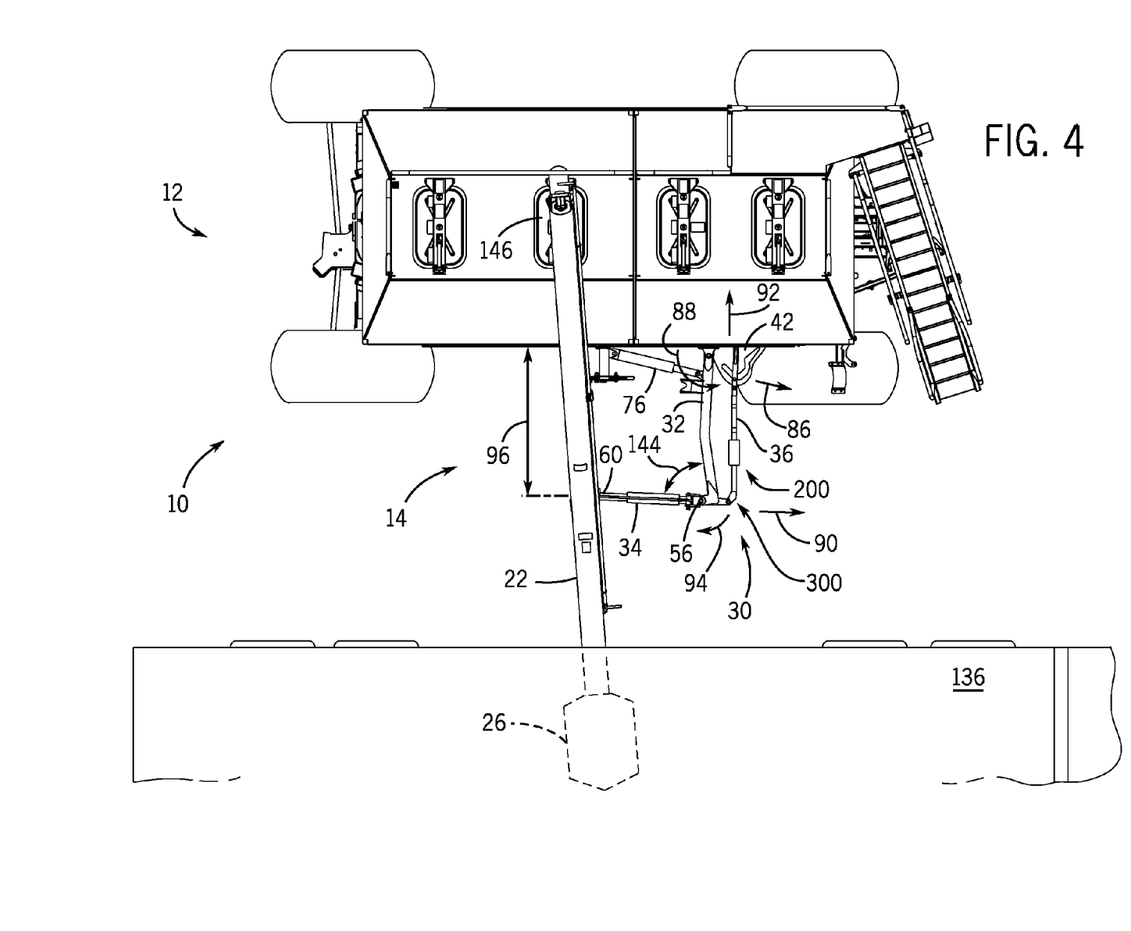
FIG. 4 is a top view of the position adjustment assembly of FIG. 2, in which the conveyor is aligned with a second storage compartment opening.

FIG. 4 is a top view of the position adjustment assembly 30, in which the conveyor 14 is aligned with a second storage compartment opening. As illustrated, the hydraulic cylinder 76 is extended relative to the position shown in FIG. 3, thereby rotating the inner arm 32 in the direction 88, and establishing an angle 144 between the inner arm 32 and the outer arm 34. In the illustrated embodiment, the angle 144 is less than the angle 138 shown in FIG. 3. As a result, the second end 60 of the outer arm 34 is positioned to facilitate alignment of the conveyor 14 with a second storage compartment opening 146. In addition, the hopper 26 remains aligned with an outlet of the truck 136. Consequently, product may flow from the truck outlet to the hopper 26, through the transporting tube 22, and into the second storage compartment opening 146. Once a desired quantity of product has been delivered to the second storage compartment, the hydraulic cylinder 76 may be extended to align the conveyor 14 with a successive storage compartment opening.

As mentioned above, the second end 64 of the intermediate link 36 is coupled to the first end 58 of the outer arm 34 via the latching mechanism 300. Accordingly, rotation of the outer arm 34 about the axis 128 relative to the intermediate link 36 is blocked by the intermediate link 36. However, in some embodiments, disconnecting the latching mechanism 300 from the outer arm 34 enables the outer arm 34 to rotate about the axis 128 into a position that places the conveyor 14 in a recovery position. In the recovery position, the conveyor 14 is configured to receive crop material remaining in the air cart 12 after operations are complete.

Figure 5:
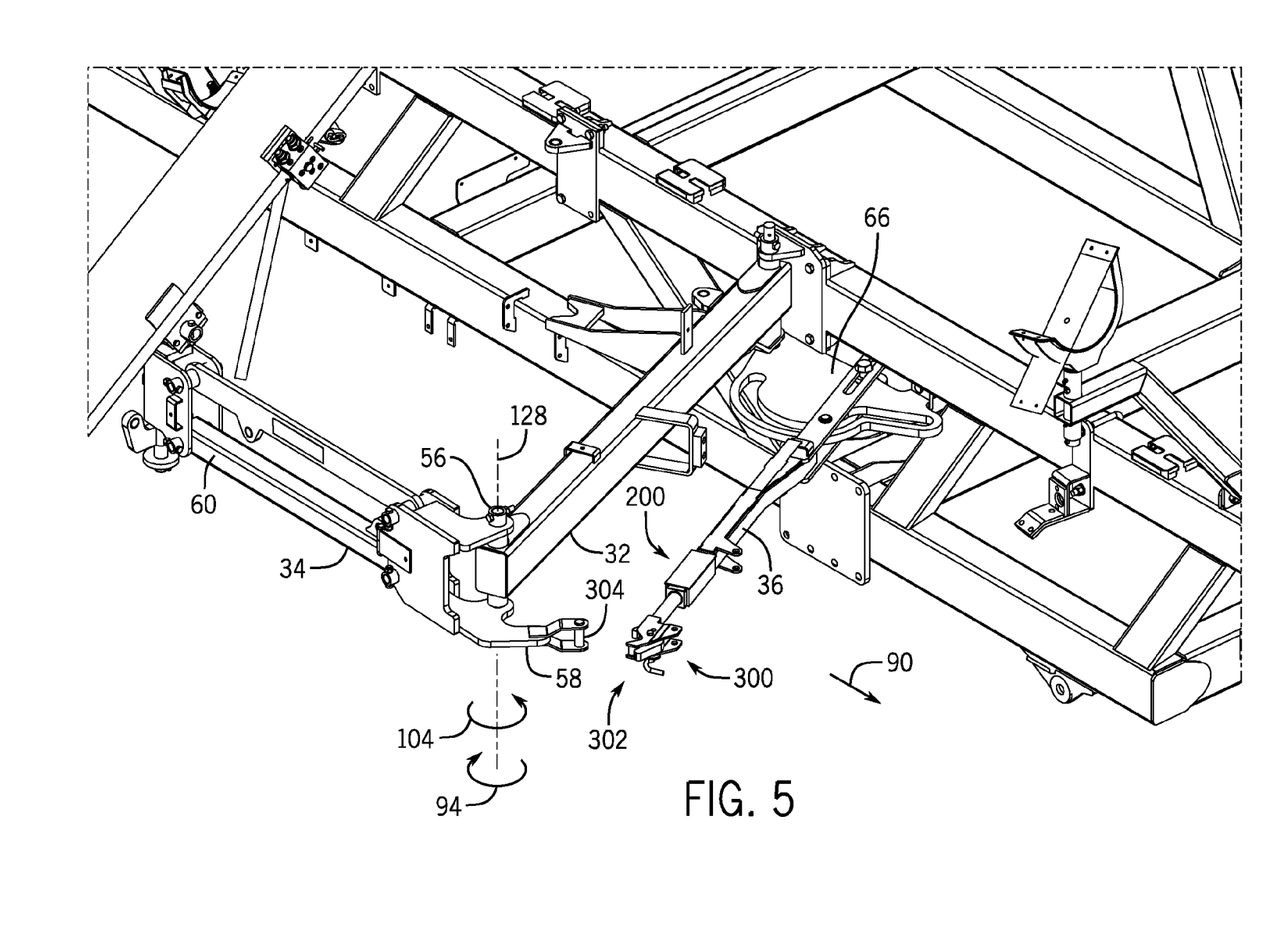
FIG. 5 is a perspective view of an embodiment of a latching mechanism that may be employed within the position adjustment assembly of FIG. 2, in which the latching mechanism is in an unlatched position.

FIG. 5 is a perspective view of the latching mechanism 300, in which the outer arm 34 is uncoupled from the intermediate link 36. In the illustrated embodiment, the latching mechanism is in an unlatched position 302, in which a coupling member 304 (e.g., mounting element) mounted to the first end 58 of the outer arm 34 is released from the latching mechanism 300. In addition, the outer arm 34 is uncoupled from the intermediate link 36. As shown, with the outer arm 34 and intermediate link 36 uncoupled, the intermediate link 36 is free to rotate in the direction 90 away from the inner arm 32. Moreover, with the outer arm 34 and intermediate link 36 uncoupled, the outer arm 34 is free to rotate about the pivot 52 (i.e., about the axis 128). For example, in some embodiments, the outer arm 34 may be rotated about the axis 128 in the direction 94 such that the second end 60 of the outer arm 34 moves toward the frame 18. In addition, the outer arm 34 may be rotated about the axis 128 in the direction 104 toward the intermediate link 36 and away from the frame 18. By rotating the outer arm 34 in the direction 104, the hopper 26 may be moved beneath the air cart 12 while avoiding obstacles (i.e., wheels, additional equipment, etc.). As a result, agricultural product remaining in the air cart 12 may be removed via compartments on the bottom of the air cart 12.

Figure 6:
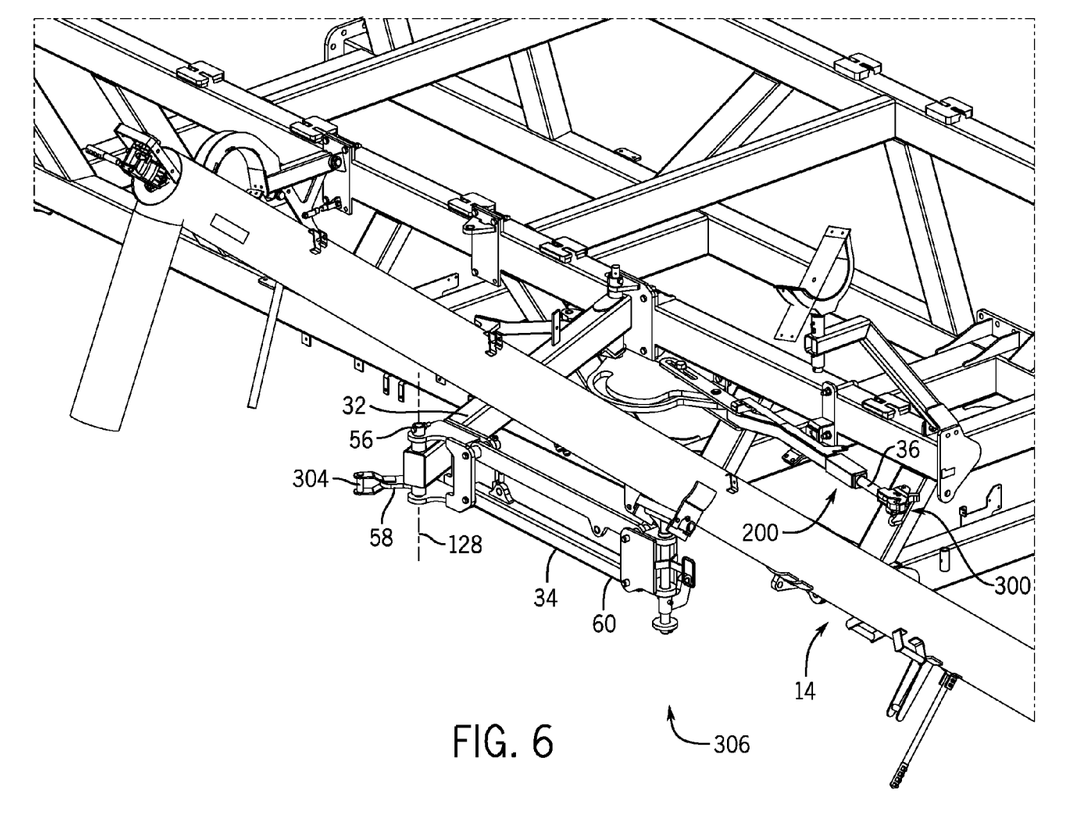
FIG. 6 is a perspective view of the position adjustment assembly of FIG. 2, in which an outer arm is in a recovery position.

As mentioned above, when the coupling member 304 is released from the latching mechanism 300, the outer arm 34 may freely rotate about the axis 128. FIG. 6 is a perspective view of the positioning assembly 30, in which the outer arm 34 in a recovery position 306. In some embodiments, the recovery position 306 enables recovery of agricultural product that remains in the storage compartments 16 after agricultural operations are complete. For example, the operator may place the outer arm 34 in the recovery position 306 and position the hopper 26 beneath the air cart 12. The storage compartments 16 may then be emptied from the bottom into the hopper 26. As a result, agricultural product is removed from the storage compartments 16 and travels through the transporting tube 22 to the truck 136 or other storage equipment.

As shown in FIG. 6, the outer arm 34 in the recovery position 306 is rotated about the axis 128 approximately 180 degrees relative to the unlatched position 302 (FIG. 5). Moreover, the intermediate link 36 is positioned adjacent to the frame 18 by rotating the intermediate link 36 in the direction 88. In some embodiments, the intermediate link 36 is approximately parallel to the frame 18. As a result, the conveyor 14 may be positioned into a location that facilitates removal of agricultural product from the storage compartments 16 as described above.

Figure 7:
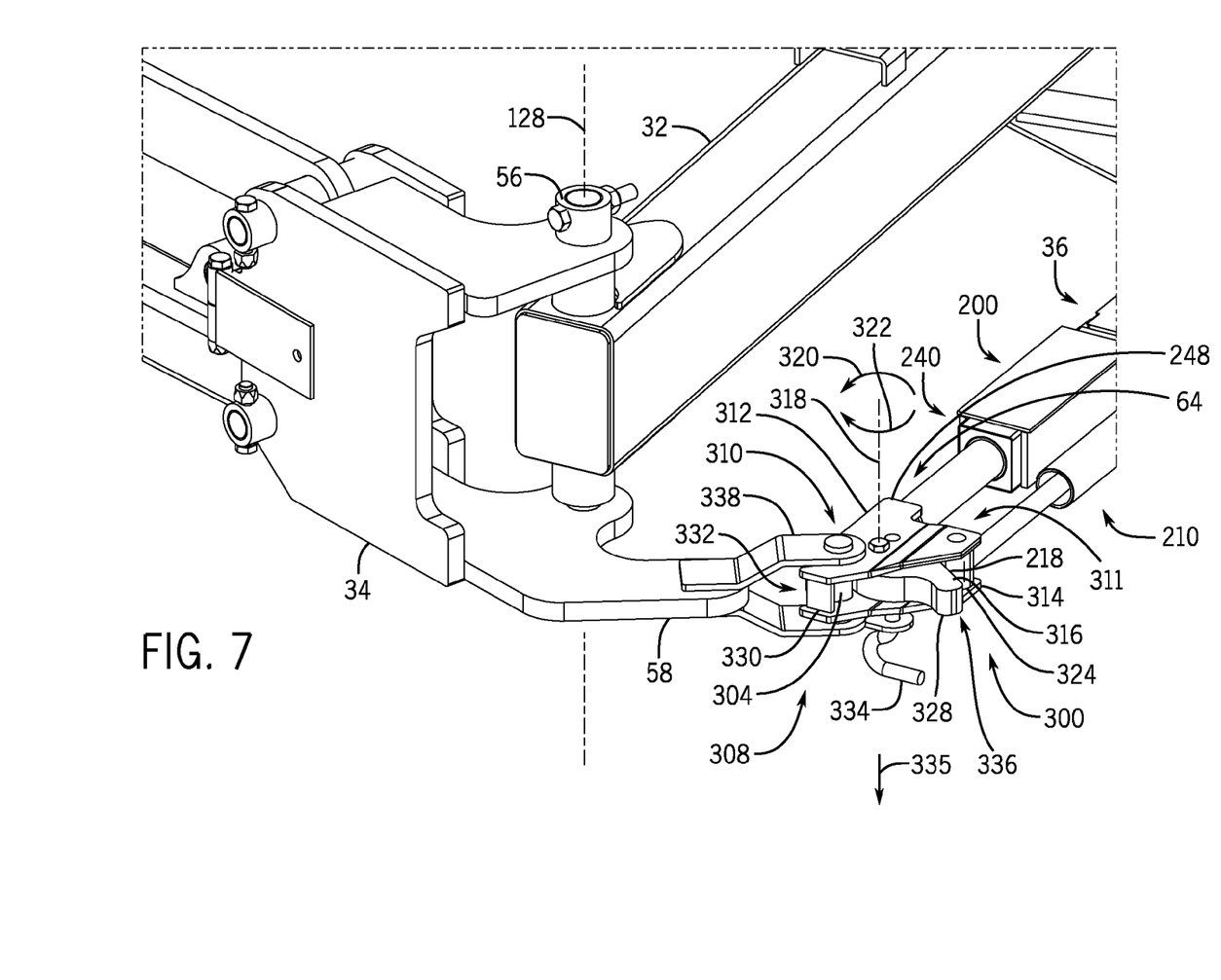
FIG. 7 is a perspective view of the latching mechanism of FIG. 5 in a latched position.

FIG. 7 is a perspective view of the latching mechanism 300 in a latched position 308 with the intermediate link 36 rotatably coupled to the outer arm 34. In the illustrated embodiment, the coupling member 304 of the outer arm 34 is rotatably secured to the latching mechanism 300. The coupling member 304 is positioned within a recess 310 formed in a housing 311. As described below, the housing 311 is configured to receive the coupling member 304 and also secure and support the components of the latching mechanism 300. For example, in the illustrated embodiment, the housing 311 includes a top plate 312 and a bottom plate 314. Moreover, the recess 310 is formed in the top plate 312 and the bottom plate 314. In the illustrated embodiment, the top plate 312 and the bottom plate 314 are substantially aligned. That is, the recess 310 formed in the top plate 312 is aligned with the recess 310 formed in the bottom plate 314. The recess 310 enables a latch 316 to capture the coupling member 304 and to secure the outer arm 34 to intermediate link 36. As shown, the latch 316 is disposed within the housing 311.

The latch 316 of the latching mechanism 300 is configured to secure the coupling member 304 of the outer arm 34 to the latching mechanism 300. In the illustrated embodiment, the latch 316 is rotatably positioned between the top plate 312 and the bottom plate 314. Additionally, the latch 316 is configured to rotate about a latch axis 318. In some embodiments, the latch 316 is configured to rotate about the latch axis 318 in the latching direction 320 and in the unlatching direction 322. Accordingly, rotation of the latch 316 about the latch axis 318 transitions the latching mechanism 300 between the unlatched position 302 and the latched position 308. However, in alternative embodiments, the latch 316 may transition between the unlatched position 302 and the latched position 308 with linear movement. For example, the latch 316 may slide along the housing 311 between the unlatched position 302 and the latched position 308.

As mentioned above, the latching mechanism 300 is coupled to the second end 64 of the intermediate link 36. For example, the second end 218 of the hydraulic cylinder 210 is coupled to a mounting member 324 in the illustrated embodiment. However, in other embodiments, the second end 218 may be coupled directly to the top plate 312, the bottom plate 314, or a combination thereof. Additionally, the second end 248 of the telescoping member is disposed between the top plate 312 and the bottom plate 314 and coupled to the latching mechanism 300. In embodiments in which the telescoping member 240 and the hydraulic cylinder 210 are integrated, the integrated unit may be connected to the mounting member 324, the top plate 312, the bottom plate 314, or a combination thereof. For example, in some embodiments, the integrated unit is coupled to both the mounting member 324 and the bottom plate 314. Accordingly, the latching mechanism 300 moves as the positioning assembly 200 extends and retracts.

In some embodiments, the latch 316 includes a hook portion 326 (shown in FIG. 8) and a trailing portion 328. As mentioned above, the hook portion 326 is configured to capture the coupling member 304 to secure the outer arm 34 to the intermediate link 36. In addition, the trailing portion 328 is configured to block rotation of the latch 316 beyond a desired maximum angle. For example, in the illustrated embodiment, the trailing portion 328 is configured to contact the mounting member 324 while the latch is in the latched position 308 to block further rotation about the latch axis 318 in the latching direction 320. Moreover, the trailing portion 328 is configured to contact a blocking member 330 to block rotation of the latch 316 about that latch axis 318 in the unlatching direction 322 while the latch 316 is in the unlatched position 302. As shown, the blocking member 330 is disposed between the top plate 312 and the bottom plate 314 on a distal end 332 of the latching mechanism 300. As illustrated, the blocking member 330 is positioned farther from the positioning assembly 200 than the recess 310. As a result, in the illustrated embodiment, the trailing portion 328 blocks rotation of the latch 316 about the latch axis 318 in the latching direction 320 beyond the latched position 308 and in the unlatching direction 322 beyond the unlatched position 302.

As shown in FIG. 7, the latching mechanism 300 includes a pin 334 coupled to the bottom plate 314. For example, in some embodiments, the pin 334 is spring loaded and biased upwardly toward the housing 311 (e.g., the bottom plate 314, the top plate 312). In the illustrated embodiment, the pin 334 locks the latch 316 in the latched position 308. For example, the bottom plate 314 includes an aperture through which the pin 334 extends upwardly and into contact with the latch 316. The latch 316 includes a corresponding aperture configured to receive the pin 334. While the pin 334 is engaged with the latch 316, rotational movement of the latch 316 about the latch axis 318 is blocked. For instance, the pin 334 may lock the latch 316 in the latched position 308 while the coupling member 304 is within the recess 310, as illustrated. Manual release of the pin 334 (e.g., movement of the pin in the direction 335) enables the latch 316 to move to the unlatched position 302. For example, the operator may manually release the pin 334 and engage movement of the intermediate link 36 to move the coupling member 304 out of the recess 310. However, in other embodiments, a different mechanism may be used to hold the latch 316 in the latched position 308. For example, a clip may be attached to the bottom plate 314 and configured to receive a corresponding member mounted to the bottom of the latch 316, thereby blocking movement of the latch 316. As will be appreciated by one skilled in the art, a variety of mechanisms and fasteners may be used to lock the latch 316 into the latched position 308. Moreover, the pin 334 or other fastener may be used to move the latch 316 into the latched position 308 when the coupling member 304 is not in place. For example, the operator may manually move the latch 316 into the latched position 308 for storage or transportation.

In the illustrated embodiment, the latching mechanism 300 includes a biasing member 336 coupled to the latch 316 and/or to the housing 311. For example, the biasing member 336 may be coupled to the trailing portion 328 of the latch 316 and the bottom plate 314 of the housing 311. The biasing member 336 is configured to bias the latch 316 toward the latched position 308 while the coupling member 304 is in the recess 310. For example, in the illustrated embodiment, the biasing member 336 is a spring that urges the latch 316 to rotate about the latch axis 318 in the latching direction 320. Accordingly, the latch 316 is driven to rotate toward the latched position 308 while the coupling member 304 is in the recess 310 and, in some embodiments, the pin 334 locks the latch 316 in the latched position 308. As described in detail below, the latch 316 may be mounted in an off-center position. That is, the biasing member 336 may urge the latch 316 to rotate in the latching direction 320 while the coupling member 304 contacts the latch 316 as the coupling member 304 engages the recess 310. For example, the coupling member 304 may engage the recess 310 and contact the latch 316. As a result, the biasing member 336 shifts relative to the latch axis 318 and enables rotation of the latch 316 about the latch axis 318 in the latching direction 320. Accordingly, in some embodiments, the latch 316 is locked into the latched position 308 by the pin 334. However, while the coupling member 304 is not engaged with the recess 310, the biasing member 336 may maintain the latch 316 in the unlatched position 302 configured to receive the coupling member 304.

However, in alternative embodiments, the biasing member 336 urges the latch 316 to rotate about the latch axis 318 in the unlatching direction 322. As a result, the latch 316 is positioned to receive the coupling member 304. For example, the biasing member 336 drives the latch 316 to rotate in the unlatching direction 322 once the pin 334 is removed from the latch 316. In certain embodiments, the latch 316 is biased toward both the unlatched position 302 and the latched position 308. For example, in the illustrated embodiment, the latch 316 is mounted off-center relative to the latch axis 318. As a result, the hook portion 326 remains clear of the recess 310 while the latch 316 is in the unlatched position 302, thereby enabling the coupling member 304 to enter the recess 310 and engage the latch 316. Engagement of the latch 316 by the coupling member 304 drives the latch 316 to rotate toward the latched position 308, as described above. However, upon release of the pin 334 and removal of the coupling member 304 from the recess 310, the latch 316 is driven to rotate in the unlatching direction 322 toward the unlatched position 302 by the biasing member 336 (e.g., springs). In other embodiments, the operator may manually move the latch 316 in the unlatching direction 322. Moreover, once in the unlatched position 302, the biasing member 336 holds the latch 316 in the unlatched position 302 until the latch 316 is acted on (e.g., by the coupling member 304, by the operator, etc.).

As mentioned above, the coupling member 304 of the outer arm 34 is configured to interact with the recess 310 of the top plate 312 and the bottom plate 314 to secure the outer arm 34 to the intermediate link 36. As shown, the coupling member 304 is disposed between arms of a coupling assembly 338. The coupling assembly 338 couples the coupling member 304 to the second end 58 of the outer arm 34. In some embodiments, the coupling assembly 338 and the coupling member 304 are an integrally formed piece.

Figure 8:
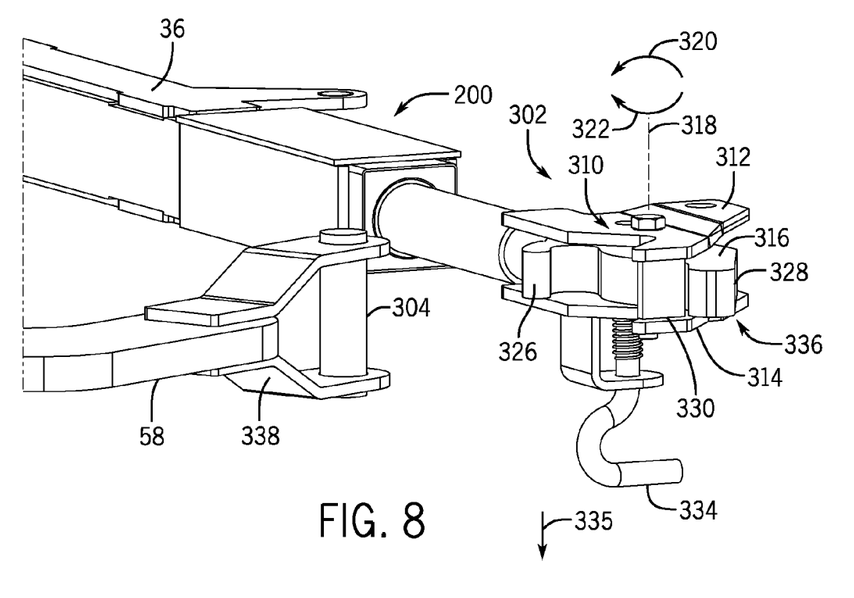
FIG. 8 is a perspective view of the latching mechanism of FIG. 5 in an unlatched position.

FIG. 8 is a perspective view of the latching mechanism 300 in the unlatched position 302. In the illustrated embodiment, the latch 316 is rotated about the latch axis 318 in the unlatching direction 322 such that the trailing portion 328 is in contact with the blocking member 330. As described above, the blocking member 330 blocks over rotation in the unlatching direction 322 beyond the unlatched position 302. As a result, the latch 316 is positioned to receive the coupling member 304 while the latch 316 is in the unlatched position 302. As shown, the hook portion 326 is clear of the recess 310, thereby enabling the coupling member 304 to enter the recess and engage the latching mechanism 300.

Figure 9:
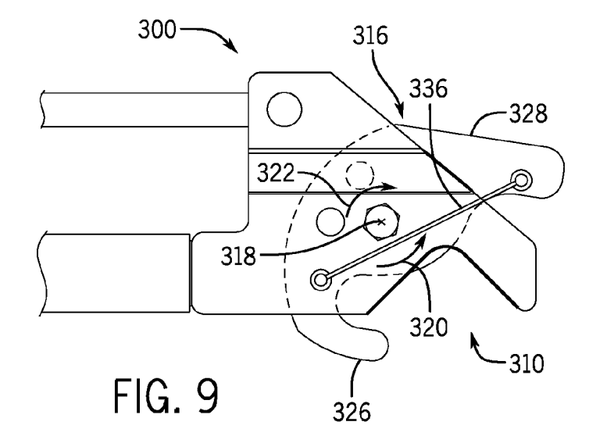
FIG. 9 is a top view of the latching mechanism of FIG. 5 in an unlatched position.

FIG. 9 is a top view of the latching mechanism 300 in the unlatched position 302. As described above, the latch 316 is mounted in an off-center position. As a result, the biasing member 336 is positioned substantially below the latch axis 318. Therefore, the latch 316 remains in the unlatched position 302 until acted upon. For example, as described above, the coupling member 304 may engage the recess 310 and contact the latch 316. Contact to the latch 316 may move the biasing member 336 substantially above the latch axis 318, thereby urging the latch 316 to rotate about the latch axis 318 in the latching direction 320. Accordingly, the biasing member 336 is configured to maintain the latch 316 in the unlatched position 302 until the latch 316 is acted upon (e.g., by the coupling member 304, by the operator, etc.).

As described in detail above, the disclosed embodiments include the latching mechanism 300 for the position adjustment assembly 30. Specifically, the latching mechanism 300 is configured to selectively secure the outer arm 34 to the intermediate link 36. For example, the hydraulic cylinder 210 and the telescoping member 240 are configured to extend and/or retract to control rotation of the outer arm 34 about the axis 128 in the direction 104. However, the latching mechanism 300 enables the outer arm 34 to uncouple from the intermediate link 36 to facilitate free rotation about the axis 128 in the direction 104. For example, in some embodiments, the latch 316 of the latching mechanism 300 rotates about the latch axis 318 to an unlatched position 302 to release the coupling member 304 of the outer arm 34 from the latching mechanism 300. As a result, the outer arm 34 may freely rotate about the axis 128 in the direction 104 to the recovery position 306.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural conveyor system, comprising:
    an inner arm having a first end configured to rotatably couple to an agricultural storage system;
    an outer arm having a first end, a second end, and a pivot positioned between the first end and the second end, wherein a second end of the inner arm is rotatably coupled to the outer arm at the pivot, and an agricultural conveyor is configured to rotatably couple to the second end of the outer arm;
    a rotation control assembly configured to couple to the agricultural storage system;
    a latching mechanism comprising:
        a housing having a recess configured to receive a mounting element coupled to the first end of the outer arm; and
        a latch rotatably coupled to the housing, wherein the latch is configured to rotate about a latch axis in a first direction to secure the mounting element to the latching mechanism, and to rotate about the latch axis in a second direction, opposite the first direction, to release the mounting element from the latching mechanism;
    an intermediate link having a first end engaged with the rotation control assembly and a second end coupled to the latching mechanism; and
    a pin configured to secure the latch in a first position and in a second position, wherein the latch is configured to secure the mounting element in the recess while the latch is in the first position and the latch is configured to release the mounting element from the recess while the latch is in the second position;
    wherein the pin is biased toward the latch, and
    wherein the rotation control assembly is configured to adjust a lateral position of the first end of the intermediate link based on rotation of the inner arm relative to the agricultural storage system to control an angle of the outer arm relative to the inner arm.

2. The agricultural conveyor system of claim 1, wherein the latch comprises a first pin hole configured to receive the pin while the latch is in the first position.

3. The agricultural conveyor system of claim 1, wherein the latch comprises a hook portion configured to capture the mounting element while the latch is in the first position.

4. An agricultural conveyor system, comprising:
    an inner arm having a first end configured to rotatably couple to an agricultural storage system;
    an outer arm having a first end, a second end, and a pivot positioned between the first end and the second end, wherein a second end of the inner arm is rotatably coupled to the outer arm at the pivot, and an agricultural conveyor is configured to rotatably couple to the second end of the outer arm;
    a rotation control assembly configured to couple to the agricultural storage system;
    a latching mechanism comprising:
        a housing having a recess configured to receive a mounting element coupled to the first end of the outer arm; and
        a latch rotatably coupled to the housing, wherein the latch is configured to rotate about a latch axis in a first direction to secure the mounting element to the latching mechanism, and to rotate about the latch axis in a second direction, opposite the first direction, to release the mounting element from the latching mechanism; and
    an intermediate link having a first end engaged with the rotation control assembly and a second end coupled to the latching mechanism,
    wherein the rotation control assembly is configured to adjust a lateral position of the first end of the intermediate link based on rotation of the inner arm relative to the agricultural storage system to control an angle of the outer arm relative to the inner arm, and
    wherein the housing comprises a top plate having a first recess configured to receive the mounting element coupled to the first end of the outer arm, and a bottom plate substantially aligned with the top plate, wherein the bottom plate comprises a second recess configured to receive the mounting element coupled to the first end of the outer arm.

5. An agricultural conveyor system, comprising:
    an inner arm having a first end configured to rotatably couple to an agricultural storage system;
    an outer arm having a first end, a second end, and a pivot positioned between the first end and the second end, wherein a second end of the inner arm is rotatably coupled to the outer arm at the pivot, and an agricultural conveyor is configured to rotatably couple to the second end of the outer arm;
    a rotation control assembly configured to couple to the agricultural storage system;
    a latching mechanism comprising:

a housing having a recess configured to receive a mounting element coupled to the first end of the outer arm; and a latch rotatably coupled to the housing, wherein the latch is configured to rotate about a latch axis in a first direction to secure the mounting element to the latching mechanism, and to rotate about the latch axis in a second direction, opposite the first direction, to release the mounting element from the latching mechanism, wherein the latch is biased to rotate in the first direction while the mounting element is in the recess; and an intermediate link having a first end engaged with the rotation control assembly and a second end coupled to the latching mechanism;

wherein the rotation control assembly is configured to adjust a lateral position of the first end of the intermediate link based on rotation of the inner arm relative to the agricultural storage system to control an angle of the outer arm relative to the inner arm.

6. An agricultural conveyor system, comprising:

an inner arm having a first end configured to rotatably couple to an agricultural storage system;

an outer arm having a first end, a second end, and a pivot positioned between the first end and the second end, wherein a second end of the inner arm is rotatably coupled to the outer arm at the pivot, and an agricultural conveyor is configured to rotatably couple to the second end of the outer arm;

a rotation control assembly configured to couple to the agricultural storage system;

a latching mechanism comprising:

a housing having a recess configured to receive a mounting element coupled to the first end of the outer arm; and a latch rotatably coupled to the housing, wherein the latch is configured to rotate about a latch axis in a first direction to secure the mounting element to the latching mechanism, and to rotate about the latch axis in a second direction, opposite the first direction, to release the mounting element from the latching mechanism;

an intermediate link having a first end engaged with the rotation control assembly and a second end coupled to the latching mechanism; and a blocking member disposed between a top plate and a bottom plate, wherein the blocking member is configured to block rotation of the latch in the second direction beyond a desired angle, wherein the housing comprises a top plate having a first recess configured to receive the mounting element coupled to the first end of the outer arm, and a bottom plate substantially aligned with the top plate, wherein the bottom plate comprises a second recess configured to receive the mounting element coupled to the first end of the outer arm.

7. An agricultural conveyor system, comprising:

an inner arm having a first end configured to rotatably couple to an agricultural storage system;

an outer arm having a first end, a second end, and a pivot positioned between the first end and the second end, wherein the first end of the outer arm is coupled to a mounting element, a second end of the inner arm is rotatably coupled to the outer arm at the pivot, and an agricultural conveyor is configured to rotatably couple to the second end of the outer arm;

a rotation control assembly configured to couple to the agricultural storage system;

an intermediate link having a first end engaged with the rotation control assembly and a second end; and a latching mechanism coupled to the second end of the intermediate link, wherein a latch of the latching mechanism is configured to transition between a latched position and an unlatched position, wherein the latch captures the mounting element in the latched position and the latch releases the mounting element in the unlatched position, wherein the latch is configured to rotate about a latch axis to the latched position, and to rotate in an opposite direction about the latch axis to the unlatched position, and wherein the latch is biased to rotate to the latched position.

8. The agricultural conveyor system of claim 7, wherein the latching mechanism comprises a housing having a recess configured to receive the mounting element coupled to the first end of the outer arm.

9. The agricultural conveyor system of claim 7, wherein the outer arm is configured to rotate at least 270 degrees about the pivot while the mounting element is released from the latching mechanism.

10. The agricultural conveyor system of claim 7, wherein the intermediate link is configured to rotate away from the inner arm while the mounting element is released from the latching mechanism.

11. The agricultural conveyor system of claim 7, comprising a pin configured to secure the latch in the latched position and to secure the latch in the unlatched position, wherein the latch comprises a first pin hole configured to receive the pin while the latch is in the latched position.

12. An agricultural conveyor system, comprising:

a latching mechanism comprising a housing and a latch, wherein the latch is rotatably mounted to the housing;

a biasing member coupled to the latching mechanism;

an inner arm having a first end and a second end, wherein the first end is configured to rotatably couple to an agricultural storage system;

an outer arm having a first end, a second end, and a pivot positioned between the first end and the second end, wherein the first end comprises a mounting element configured to be captured by the latching mechanism, the second end of the inner arm is rotatably coupled to the outer arm at the pivot, and an agricultural conveyor is configured to rotatably couple to the second end of the outer arm;

a rotation control assembly configured to couple to the agricultural storage system; and an intermediate link having a first end and a second end, wherein the first end is engaged with the rotational control assembly and the second end is coupled to the latching mechanism;

wherein the latch of the latching mechanism is configured to rotate about a latch axis in a first direction to a latched position to capture the mounting element and to rotatably secure the first end of the outer arm to the second end of the intermediate link, and to rotate about the latch axis in a second direction, opposite the first direction, to an unlatched position to release the mounting element from the latching mechanism, and wherein the biasing member urges the latch to rotate toward the latched position.

13. An agricultural conveyor system, comprising:

a latching mechanism comprising a housing and a latch, wherein the latch is rotatably mounted to the housing;

an inner arm having a first end and a second end, wherein the first end is configured to rotatably couple to an agricultural storage system;
an outer arm having a first end, a second end, and a pivot positioned between the first end and the second end, wherein the first end comprises a mounting element configured to be captured by the latching mechanism, the second end of the inner arm is rotatably coupled to the outer arm at the pivot, and an agricultural conveyor is configured to rotatably couple to the second end of the outer arm;
  a rotation control assembly configured to couple to the agricultural storage system; and
  an intermediate link having a first end and a second end, wherein the first end is engaged with the rotational control assembly and the second end is coupled to the latching mechanism;
wherein the latch of the latching mechanism is configured to rotate about a latch axis in a first direction to a latched position to capture the mounting element and to rotatably secure the first end of the outer arm to the second end of the intermediate link, and to rotate about the latch axis in a second direction, opposite the first direction, to an unlatched position to release the mounting element from the latching mechanism, and
wherein the housing of the latching mechanism comprises:
  a top plate having a first recess configured to receive the mounting element; and
  a bottom plate having a second recess configured to receive the mounting element;
    wherein the top plate and the bottom plate are substantially aligned and the latch is pivotally coupled to the plates and rotates relative to the plates.
14. The agricultural conveyor system of claim 13, comprising a blocking member disposed between the top plate and the bottom plate, wherein the blocking member is configured to block rotation of the latch in the second direction beyond a desired angle.

15. An agricultural conveyor system, comprising:
a latching mechanism comprising a housing and a latch, wherein the latch is rotatably mounted to the housing;
an inner arm having a first end and a second end, wherein the first end is configured to rotatably couple to an agricultural storage system;
an outer arm having a first end, a second end, and a pivot positioned between the first end and the second end, wherein the first end comprises a mounting element configured to be captured by the latching mechanism, the second end of the inner arm is rotatably coupled to the outer arm at the pivot, and an agricultural conveyor is configured to rotatably couple to the second end of the outer arm;
a rotation control assembly configured to couple to the agricultural storage system; and
an intermediate link having a first end and a second end, wherein the first end is engaged with the rotational control assembly and the second end is coupled to the latching mechanism;
wherein the latch of the latching mechanism is configured to rotate about a latch axis in a first direction to a latched position to capture the mounting element and to rotatably secure the first end of the outer arm to the second end of the intermediate link, and to rotate about the latch axis in a second direction, opposite the first direction, to an unlatched position to release the mounting element from the latching mechanism,
wherein the latching mechanism comprises a pin configured to secure the latch in the latched position and in the unlatched position, and wherein the latch comprises a first pin hole configured to receive the pin while the latch is in the latched position, and
wherein the pin is biased toward the latch.

* * * * *